(12) United States Patent
Yamada et al.

(10) Patent No.: US 9,739,224 B2
(45) Date of Patent: Aug. 22, 2017

(54) TURBOCHARGER-EQUIPPED INTERNAL COMBUSTION ENGINE

(71) Applicant: Toyota Jidosha Kabushiki Kaisha, Toyota-shi (JP)

(72) Inventors: Tomoko Yamada, Toyota (JP); Kazushiro Fujimura, Toyota (JP); Tomohiko Matsushita, Toyota (JP); Hirohiko Oota, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/055,746

(22) Filed: Feb. 29, 2016

(65) Prior Publication Data

US 2016/0258370 A1   Sep. 8, 2016

(30) Foreign Application Priority Data

Mar. 2, 2015   (JP) .................................. 2015-040423

(51) Int. Cl.
*F01N 3/00* (2006.01)
*F02D 41/02* (2006.01)
(Continued)

(52) U.S. Cl.
CPC ......... *F02D 41/029* (2013.01); *F01N 3/0253* (2013.01); *F01N 9/002* (2013.01); *F01N 11/002* (2013.01); *F02D 41/0007* (2013.01); *F02D 41/1448* (2013.01); *F02D 41/1466* (2013.01); *F01N 2550/04* (2013.01);
(Continued)

(58) Field of Classification Search
USPC .......... 60/280, 285, 286, 295, 297, 303, 311
See application file for complete search history.

(56) References Cited

U.S. PATENT DOCUMENTS 6,901,751 B2* 6/2005 Bunting ................. F01N 3/023
180/65.1
8,347,613 B2* 1/2013 Van Nieuwstadt ... F01N 3/0238
60/278
(Continued)

FOREIGN PATENT DOCUMENTS

JP    2002-21623    1/2002
JP    2004-36454    2/2004
(Continued)

*Primary Examiner* — Binh Q Tran
(74) *Attorney, Agent, or Firm* — Oblon, McClelland, Maier & Neustadt, L.L.P.

(57) ABSTRACT

A turbocharger-equipped internal combustion engine includes an exhaust turbine, an exhaust filter, a differential pressure detector, an atmospheric pressure sensor, and an electronic control unit. The electronic control unit is configured to control the internal combustion engine such that accumulation amount of a particulate matter in the exhaust filter is regulated. The electronic control unit is configured to control the internal combustion engine such that the accumulation amount of the particulate matter in the exhaust filter is increased, when the pressure difference detected by the differential pressure detector is a lower limit or less. The electronic control unit is configured to set the lower limit such that the lower limit becomes a higher value as the atmospheric pressure detected by the atmospheric pressure sensor becomes lower.

4 Claims, 7 Drawing Sheets

(51) Int. Cl.

| | | |
|---|---|---|
| *F01N 3/025* | (2006.01) | |
| *F01N 9/00* | (2006.01) | |
| *F01N 11/00* | (2006.01) | |
| *F02D 41/14* | (2006.01) | |
| *F02D 41/00* | (2006.01) | |
| *F02B 39/16* | (2006.01) | |

(52) U.S. Cl.
CPC .. *F01N 2560/08* (2013.01); *F01N 2900/1606* (2013.01); *F02B 2039/166* (2013.01); *F02D 2200/0406* (2013.01); *F02D 2200/0812* (2013.01); *F02D 2200/703* (2013.01); *Y02T 10/47* (2013.01)

(56) References Cited

U.S. PATENT DOCUMENTS

| | | | |
|---|---|---|---|
| 9,181,861 B2* | 11/2015 | Kashiwagi | F02B 37/12 |
| 2006/0026950 A1* | 2/2006 | Kondou | F01N 3/023 |
| | | | 60/297 |
| 2007/0277509 A1* | 12/2007 | Tahara | F01N 3/0253 |
| | | | 60/286 |
| 2009/0084097 A1* | 4/2009 | Sato | F01N 11/002 |
| | | | 60/311 |
| 2010/0018186 A1* | 1/2010 | Shibata | B01D 46/0086 |
| | | | 60/277 |
| 2011/0146233 A1 | 6/2011 | Carlill et al. | |
| 2012/0102944 A1 | 5/2012 | Fulton et al. | |

FOREIGN PATENT DOCUMENTS

| | | |
|---|---|---|
| JP | 2004-76684 | 3/2004 |
| JP | 2014-77412 | 5/2014 |

\* cited by examiner

TURBOCHARGER-EQUIPPED INTERNAL COMBUSTION ENGINE

INCORPORATION BY REFERENCE

The disclosure of Japanese Patent Application No. 2015-040423 filed on Mar. 2, 2015 including the specification, drawings and abstract is incorporated herein by reference in its entirety.

BACKGROUND OF THE INVENTION

1. Field of the Invention

The invention relates to a turbocharger-equipped internal combustion engine.

2. Description of Related Art

Conventionally, there is often used a turbocharger-equipped internal combustion engine in which an exhaust turbine is provided in an exhaust passage, as described in Japanese Patent Application Publication No. 2014-77412.

SUMMARY OF THE INVENTION

In the turbocharger-equipped internal combustion engine, under an environment in which the atmospheric pressure is low, as exemplified by the highland environment, the pressure (turbine downstream pressure) on an exhaust downstream side of the exhaust passage relative to the exhaust turbine easily decreases, and therefore, the expansion ratio of the exhaust turbine (the value resulting from dividing exhaust pressure PU on an exhaust upstream side by turbine downstream pressure PB [=PU/PB]) easily increases. Then, an excessive increase in the expansion ratio of the exhaust turbine causes a decrease in the durability performance of the exhaust turbine.

Here, the internal combustion engine described in JP 2014-77412 A is provided with a turbocharger including a variable nozzle mechanism with multiple nozzle vanes that are disposed around a turbine wheel. By employing such a turbocharger and setting the vane opening degree of the variable nozzle mechanism to an opening degree on the open side when the atmospheric pressure is low, it is possible to suppress the expansion ratio of the exhaust turbine to a low ratio. However, in such an internal combustion engine, the supercharging pressure decreases, and thereby, the engine output decreases.

The invention provides a turbocharger-equipped internal combustion engine that makes it possible to suppress the decrease in the engine output and suppress the decrease in the durability performance of the exhaust turbine.

A turbocharger-equipped internal combustion engine according to an aspect of the invention includes an exhaust turbine, an exhaust filter, a differential pressure detector, an atmospheric pressure sensor, and an electronic control unit. The exhaust turbine is provided in an exhaust passage of the internal combustion engine. The exhaust filter is provided on an exhaust downstream side of the exhaust passage relative to the exhaust turbine. The exhaust filter is configured to collect particulate matter in exhaust gas. The differential pressure detector is configured to detect a pressure difference between an exhaust upstream side and an exhaust downstream side of the exhaust passage relative to the exhaust filter. The atmospheric pressure sensor is configured to detect atmospheric pressure. The electronic control unit is configured to control the internal combustion engine such that accumulation amount of the particulate matter in the exhaust filter is regulated. The electronic control unit is configured to control the internal combustion engine such that the accumulation amount of the particulate matter in the exhaust filter is increased, when the pressure difference detected by the differential pressure detector is a lower limit or less. The electronic control unit is configured to set the lower limit such that the lower limit becomes a higher value as the atmospheric pressure detected by the atmospheric pressure sensor becomes lower.

In the turbocharger-equipped internal combustion engine according to the above aspect, as the atmospheric pressure becomes lower, the pressure (turbine downstream pressure) on the exhaust downstream side of the exhaust passage relative to the exhaust turbine easily decreases, and therefore, the expansion ratio of the exhaust turbine easily increases. Therefore, it is likely that an excessive increase in the expansion ratio of the exhaust turbine can be suppressed if the turbine downstream pressure can be maintained at a high pressure without being decreased, when the atmospheric pressure is low.

In the above internal combustion engine, the exhaust filter is provided on the exhaust downstream side of the exhaust passage relative to the exhaust turbine, and the lower limit of the pressure difference between the exhaust upstream side and the exhaust downstream side relative to the exhaust filter (hereinafter, referred to as merely the "pressure difference") becomes a higher value as the atmospheric pressure detected by the atmospheric pressure sensor becomes lower. Therefore, when the atmospheric pressure is low and the turbine downstream pressure easily decreases, the pressure difference of the exhaust filter detected by the differential pressure detector easily falls below the lower limit, and the actuation control of a regulation unit is easily executed in such a manner that the PM accumulation amount increases, resulting in the increase in the accumulation amount of the particulate matter (PM) in the exhaust filter. Thereby, the passage resistance of the exhaust filter increases, and by a quantity corresponding to that, the exhaust pressure on the exhaust upstream side relative to the exhaust filter (=turbine downstream pressure) rises. Thus, according to the above internal combustion engine, when the atmospheric pressure is low and the turbine downstream pressure easily decreases, it is possible to increase the PM accumulation amount in the exhaust filter, and to raise the turbine downstream pressure by a quantity corresponding to that. Therefore, it is possible to maintain the turbine downstream pressure at a high pressure. Thereby, it is possible to suppress an excessive increase in the expansion ratio of the exhaust turbine, and to suppress the decrease in the durability performance of the exhaust turbine.

Here, as described above, in the internal combustion engine that employs the turbocharger including the variable nozzle mechanism and that sets the vane opening degree of the variable nozzle mechanism to a great opening degree, the decrease in the expansion ratio of the exhaust turbine causes a great decrease in the engine output. In contrast, the above internal combustion engine increases the accumulation amount of the PM in the exhaust filter, and thereby, raises the turbine downstream pressure to decrease the expansion ratio of the exhaust turbine. Thereby, it is possible to decrease the expansion ratio of the exhaust turbine, without decreasing the supercharging pressure. Therefore, according to the above internal combustion engine, it is possible to suppress an excessive increase in the expansion ratio of the exhaust turbine, without causing a great decrease in the engine output.

In the turbocharger-equipped internal combustion engine according to the above aspect, the electronic control unit may be configured to set the lower limit such that the lower limit becomes a higher value in an operating range in which exhaust pressure on the exhaust upstream side relative to the exhaust turbine is higher.

In an operating range in which the exhaust pressure (turbine upstream pressure) on the exhaust upstream side relative to the exhaust turbine is higher, a higher turbine downstream pressure is necessary for maintaining the expansion ratio of the exhaust turbine at an appropriate ratio, leading to the increase in the minimum necessary PM accumulation amount for maintaining the expansion ratio of the exhaust turbine at an appropriate ratio. According to the above internal combustion engine, in the case of an engine operating range in which the turbine upstream pressure is high, the lower limit becomes a higher value, compared to the case of an engine operating range in which the turbine upstream pressure is low. Therefore, in the case of an engine operating range in which the turbine upstream pressure is high, the pressure difference of the exhaust filter detected by the differential pressure detector easily falls below the lower limit, and the actuation control of the regulation unit is easily executed in such a manner that the PM accumulation amount increases. Therefore, it is possible to increase the accumulation amount of the PM in the exhaust filter. Thereby, in an engine operating range in which the turbine upstream pressure is high, it is possible to maintain the turbine downstream pressure at a high pressure, and therefore, it is possible to suppress an excessive increase in the expansion ratio of the exhaust turbine.

In the turbocharger-equipped internal combustion engine according to the above aspect, the electronic control unit may be configured to set the lower limit to a higher value as the atmospheric pressure detected by the atmospheric pressure sensor becomes lower, and a relation between the atmospheric pressure detected by the atmospheric pressure sensor and the lower limit is a relation in which change amount of the lower limit associated with change in the atmospheric pressure increases as the atmospheric pressure becomes lower.

The relation between the minimum necessary pressure difference of the exhaust filter for maintaining the expansion ratio of the exhaust turbine at an appropriate ratio and the atmospheric pressure is a relation in which the above minimum necessary pressure difference of the exhaust filter increases as the atmospheric pressure becomes lower. Furthermore, the relation is a relation in which the change amount of the above minimum necessary pressure difference associated with the change in the atmospheric pressure increases as the atmospheric pressure becomes lower. According to the above internal combustion engine, it is possible to set the lower limit of the pressure difference of the exhaust filter, in accordance with such a relation, and therefore, it is possible to maintain the expansion ratio of the exhaust turbine at an appropriate ratio, depending on the atmospheric pressure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
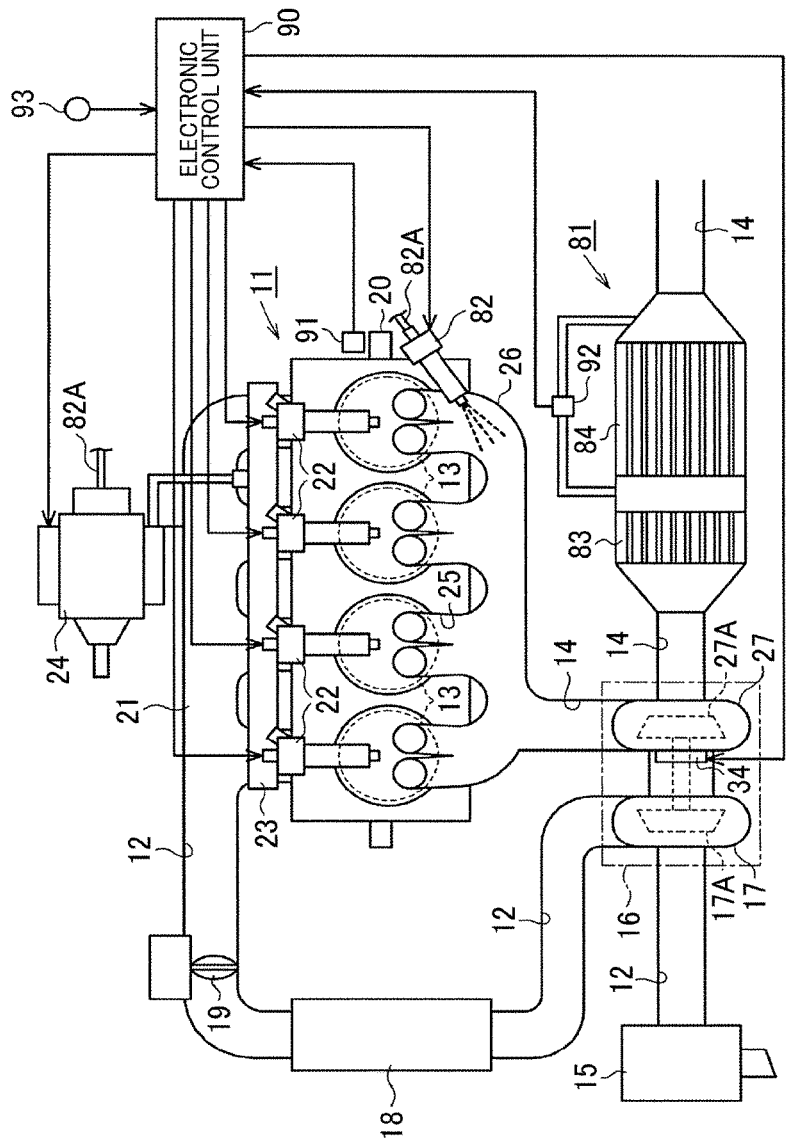
FIG. 1 is a simplified diagram showing a schematic configuration of an internal combustion engine in a first embodiment.

Hereinafter, a first embodiment of a turbocharger-equipped internal combustion engine will be described. As shown in FIG. 1, an internal combustion engine 11 includes an intake passage 12, combustion chambers 13 and exhaust passage 14. At the uppermost part of the intake passage 12, an air cleaner 15 to purify the air taken in the intake passage 12 is provided. Further, in the intake passage 12, a compressor 17 of a turbocharger 16, an intercooler 18 and an intake throttle valve 19 are arranged in order from the air cleaner 15 to the intake downstream side. The intake passage 12 branches in an intake manifold 21 provided on the intake downstream side relative to the intake throttle valve 19, and through the branching parts, the intake passage 12 is connected with the combustion chambers 13 for the respective cylinders of the internal combustion engine 11.

In the internal combustion engine 11, a fuel injection valve 22 to inject the fuel that is supplied for the combustion in the combustion chamber 13 is provided for each cylinder. With each fuel injection valve 22, a common rail 23 for the pressure accumulation of high-pressure fuel is connected. To the common rail 23, the high-pressure fuel discharged from a fuel pump 24 is fed.

The connection parts of the exhaust passage 14 with the combustion chambers 13 form exhaust ports 25. In the exhaust passage 14, an exhaust manifold 26 for collecting the exhaust gas ejected from the combustion chambers 13 through the exhaust ports 25, and an exhaust turbine 27 of the turbocharger 16 are provided.

In the internal combustion engine 11, the air taken in the intake passage 12 is purified by the air cleaner 15, and thereafter, is introduced into the compressor 17 of the turbocharger 16. In the compressor 17, by a compressor wheel 17A to rotate in the interior, the introduced air is compressed and is discharged to the intercooler 18. The air having a high temperature by the compression is cooled by the intercooler 18, and thereafter, is distributed and fed to the combustion chambers 13 for the respective cylinders, through the intake throttle valve 19 and the intake manifold 21. The flow rate of the air in the intake passage 12 is regulated by an opening degree control of the intake throttle valve 19.

To the combustion chambers 13 into which the air has been introduced, the fuel is injected from the fuel injection valves 22, by compression strokes of the cylinders.

Then, the air-fuel mixture of the air introduced through the intake passage 12 and the fuel injected from the fuel injection valves 22 is combusted in the combustion chambers 13. By the combustion gas that is generated at this time and that has a high temperature and a high pressure, pistons (not illustrated) are reciprocated, and a crankshaft 20, which is an output shaft, is rotated, so that the driving force of the internal combustion engine 11 is obtained.

The exhaust gas generated by the combustion in the combustion chambers 13 is introduced into the exhaust turbine 27 of the turbocharger 16 through the exhaust manifold 26. By the flow power of the introduced exhaust gas, a turbine wheel 27A in the exhaust turbine 27 is driven and rotated, and then, in conjunction with this, the compressor wheel 17A in the compressor 17 provided in the intake passage 12 is driven and rotated, so that the compression of the above air is performed. Here, the above turbocharger 16 includes a variable nozzle mechanism 34 for regulating the flow velocity of the exhaust gas to blow on the turbine wheel 27A. The variable nozzle mechanism 34 includes multiple nozzle vanes (not illustrated) disposed around the turbine wheel 27A at equal angle intervals. Then, by increasing the opening degree (nozzle opening degree) of the nozzle vanes (specifically, by actuating the nozzle vanes such that the distance between adjacent nozzle vanes increases), the flow velocity of the exhaust gas to blow on the turbine wheel 27A is decreased.

The exhaust passage 14 of the internal combustion engine 11 is provided with an exhaust gas control apparatus 81 for purifying the exhaust gas. The exhaust gas control apparatus 81 includes a fuel addition valve 82 for adding fuel to the exhaust gas, as well as an oxidation catalyst 83 to oxidize HC (hydrocarbon) in the exhaust gas and an exhaust filter 84 to collect the particulate matter (PM) in the exhaust gas.

The oxidation catalyst 83 is provided on the exhaust downstream side of the exhaust passage 14 relative to the exhaust turbine 27, and supports a catalyst to purify the exhaust gas by the oxidation of HC and CO (carbon monoxide) in the exhaust gas. The exhaust filter 84 is provided on the exhaust downstream side of the exhaust passage 14 relative to the above oxidation catalyst 83. The exhaust filter 84 is formed of a porous material that permits the passing of gas components in the exhaust gas and that blocks the passing of the PM in the exhaust gas, and supports a catalyst for promoting the oxidation of the PM. The fuel addition valve 82 is provided on the exhaust upstream side of the exhaust passage 14 relative to the above exhaust turbine 27 (in detail, in the exhaust manifold 26). The fuel addition valve 82 is connected with the above fuel pump 24 through a fuel passage 82A, and injects the fuel supplied from the fuel pump 24, in the exhaust gas.

The internal combustion engine 11 is provided with various sensors for detecting the operating state. As the various sensors, for example, a crank sensor 91 for detecting the speed of the crankshaft 20 (engine speed NE), a differential pressure sensor 92 that is a differential pressure detector for detecting the difference (pressure difference $\Delta P$) in exhaust gas pressure between the exhaust upstream side and the exhaust downstream side of the exhaust passage 14 relative to the exhaust filter 84, an atmospheric pressure sensor 93 for detecting the atmospheric pressure, and the like are provided.

Further, the internal combustion engine 11 includes an electronic control unit 90 that, for example, is configured mainly by a microcomputer, and the electronic control unit 90 takes in output signals of the various sensors. The electronic control unit 90 performs various computations based on the output signals of the various sensors, and executes various controls relevant to the operation of the internal combustion engine 11, based on the computation results. The various controls include the actuation control of the intake throttle valve 19, the actuation control of the fuel injection valve 22, the actuation control of the fuel pump 24, the actuation control of the variable nozzle mechanism 34, and the like. In the embodiment, the electronic control unit 90 controls the fuel addition valve 82 of the internal combustion engine 11, to regulate the accumulation amount of the particulate matter in the exhaust filter 84.

As the various controls, the electronic control unit 90 executes an actuation control (filter regeneration control) of the fuel addition valve 82 for the function recovery of the exhaust filter 84. In the filter regeneration control, the valve opening drive of the fuel addition valve 82 is intermittently performed, and thereby, the fuel is added in the exhaust gas of the internal combustion engine 11. When such a filter regeneration control is executed, the added fuel is oxidized in the oxidation catalyst 83 and the exhaust filter 84, and thereby, the temperature of the exhaust filter 84 rises. In the filter regeneration control, the intermittent valve opening drive of the fuel addition valve 82 is executed repeatedly, such that the exhaust filter 84 becomes a predetermined high-temperature state (for example, 600° C. or higher). Thereby, the PM accumulated in the exhaust filter 84 is oxidized, and is ejected as CO2 (carbon dioxide) and H2O (water). Thus, the regeneration of the exhaust filter 84 is achieved by the oxidation process of the PM.

In the embodiment, when PM accumulation amount PMsm in the exhaust filter 84 becomes equal to or greater than a previously decided accumulation amount determination value A while the filter regeneration control is not being executed, an on-operation of a regeneration execution flag is performed, and the execution of the filter regeneration control is permitted. Then, when the PM accumulation amount PMsm becomes equal to or less than a predetermined regeneration finish value PMe during the execution of the filter regeneration control, an off-operation of the regeneration execution flag is performed, and the execution of the filter regeneration control is stopped. Here, the above PM accumulation amount PMsm is an estimated value of the amount of the PM collected and accumulated in the exhaust filter 84, and is calculated by a well-known technique based on the operating state of the internal combustion engine 11 such as the above pressure difference $\Delta P$.

Here, under an environment in which the atmospheric pressure is low (for example, the highland environment), in the exhaust passage 14 of the internal combustion engine 11, the pressure on the exhaust downstream side relative to the exhaust turbine 27 easily decreases, and therefore, the expansion ratio of the exhaust turbine 27 (the value resulting from dividing the exhaust pressure on the exhaust upstream side relative to the exhaust turbine 27 [turbine upstream pressure PU] by the exhaust pressure on the exhaust downstream side [turbine downstream pressure PB] [=PU/PB]) easily increases. Then, there is a fear that an excessive increase in the expansion ratio of the exhaust turbine 27 causes a decrease in the durability performance of the exhaust turbine 27.

In view of this point, the internal combustion engine 11 in the embodiment sets a lower limit for the pressure difference $\Delta P$ between the exhaust upstream side and the exhaust downstream side relative to the exhaust filter 84. Then, when the pressure difference $\Delta P$ detected by the differential pressure sensor 92 becomes the lower limit or less, the off-operation of the regeneration execution flag is performed, and the execution of the filter regeneration control is stopped.

Figure 2:
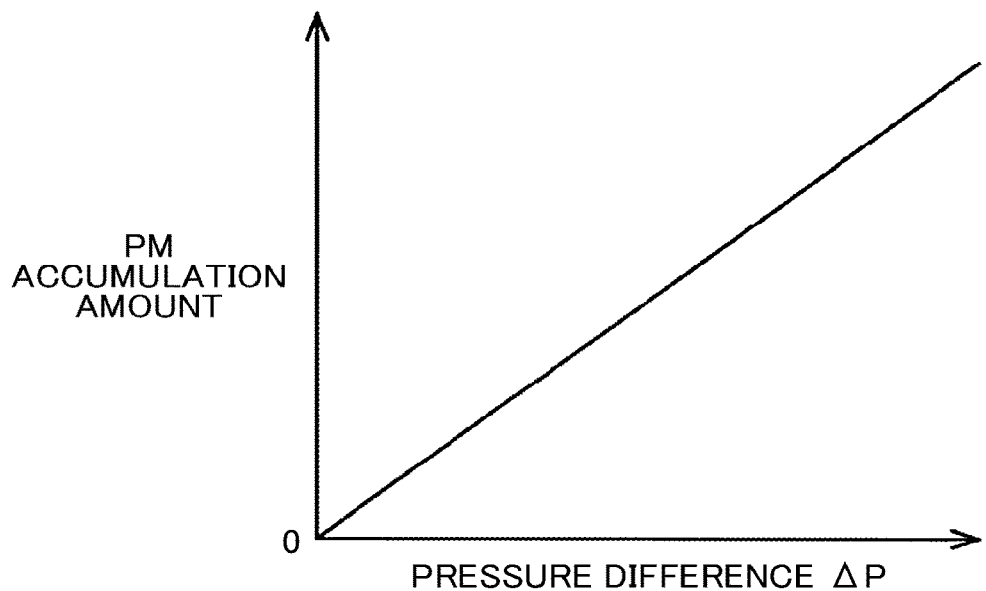
FIG. 2 is a graph showing a relation between PM accumulation amount and pressure difference of an exhaust filter.
Figure 3:
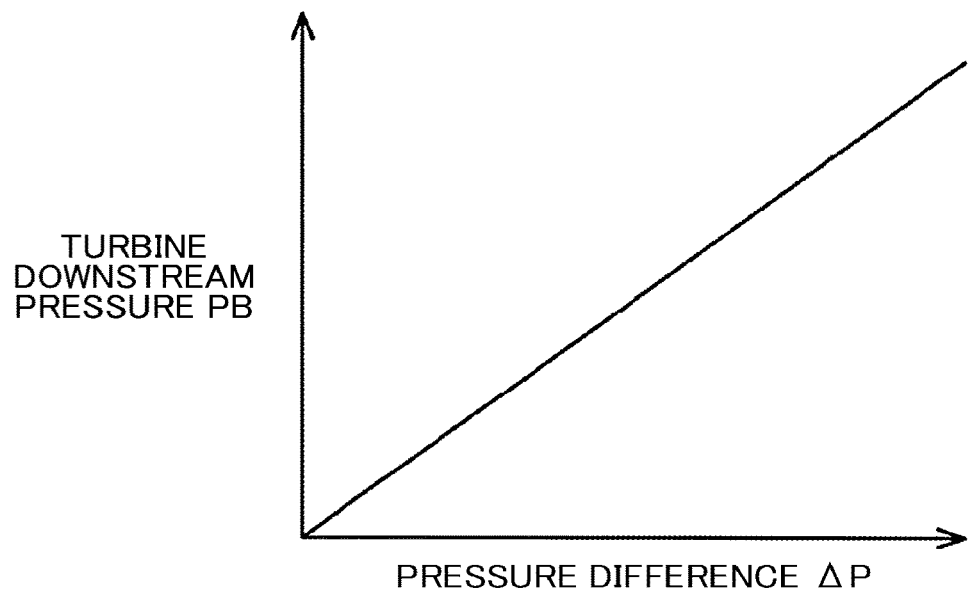
FIG. 3 is a graph showing a relation between turbine downstream pressure and the pressure difference of the exhaust filter.

Hereinafter, a setting manner for the above lower limit and an action due to the setting of the lower limit will be described in detail. As shown in FIG. 2, in the internal combustion engine 11, the pressure difference ΔP between the exhaust upstream side and the exhaust downstream side relative to the exhaust filter 84 increases, as the PM accumulation amount in the exhaust filter 84 increases. Further, as shown in FIG. 3, the turbine downstream pressure PB (in detail, the exhaust pressure at the part between the exhaust turbine 27 and the exhaust filter 84) rises, as the above pressure difference ΔP increases. As is obvious from the relations, in the internal combustion engine 11, when the accumulation amount of the PM in the exhaust filter 84 increases, the passage resistance of the exhaust filter 84 increases. Therefore, the turbine downstream pressure PB rises, and the pressure difference ΔP of the exhaust filter 84 increases, so that the expansion ratio of the exhaust turbine 27 decreases.

Figure 4:
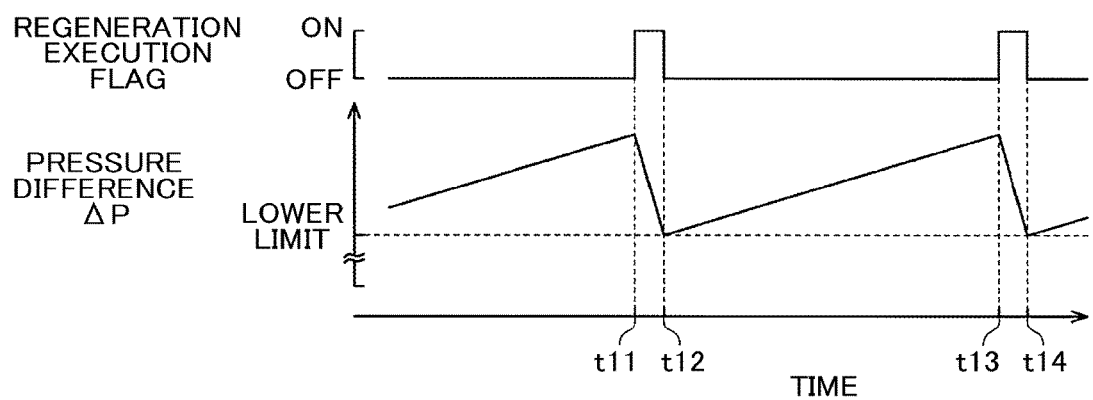
FIG. 4 is a timing chart showing an exemplary execution manner of a stop process in the first embodiment.

As shown in FIG. 4, in the embodiment, the lower limit of the pressure difference ΔP of the exhaust filter 84 is set. Therefore, during the execution of the filter regeneration control (time t11 to time t12, or time t13 to time t14), when the pressure difference ΔP of the exhaust filter 84 becomes the lower limit or less (time t12, time t14) before the PM accumulation amount PMsm in the exhaust filter 84 becomes the regeneration finish value PMe or less, the off-operation of the regeneration execution flag is performed, and the execution of the filter regeneration control is stopped. Thereby, in the subsequent period (time t12 to time t13, or after time t14), the PM accumulation amount in the exhaust filter 84 increases. Then, the turbine downstream pressure PB rises, and the pressure difference ΔP increases. Therefore, the increase in the expansion ratio of the exhaust turbine 27 is suppressed.

In the embodiment, as the lower limit of the pressure difference ΔP, a value that is suitable for moderately suppressing the increase in the expansion ratio of the exhaust turbine 27 is set. In detail, the lower limit of the pressure difference ΔP is set as follows.

In the internal combustion engine 11, as the atmospheric pressure PA becomes lower, the turbine downstream pressure PB more easily decreases, and therefore, the expansion ratio of the exhaust turbine 27 more easily increases. Therefore, it is likely that an excessive increase in the expansion ratio of the exhaust turbine 27 can be suppressed if the turbine downstream pressure PB can be maintained at a high pressure without being decreased, when the atmospheric pressure PA is low.

Figure 5:
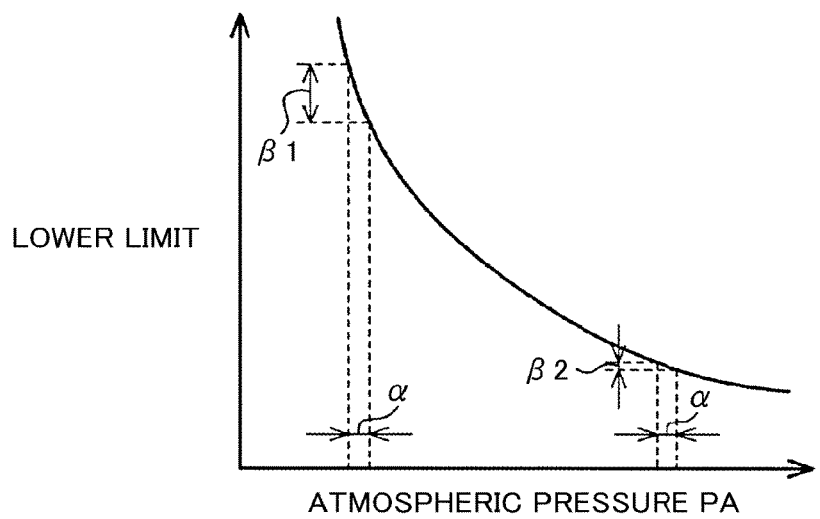
FIG. 5 is a graph showing a relation between the lower limit of the pressure difference of the exhaust filter and the atmospheric pressure.

In view of this point, as shown in FIG. 5, in the embodiment, a relation in which the lower limit becomes a higher value as the atmospheric pressure PA becomes lower is decided as the relation between the lower limit of the pressure difference ΔP of the exhaust filter 84 and the atmospheric pressure PA detected by the atmospheric pressure sensor 93.

By deciding such a relation, as the turbine downstream pressure PB more easily decreases because the atmospheric pressure PA becomes lower, the pressure difference ΔP of the exhaust filter 84 more easily falls below the lower limit during the execution of the filter regeneration control, and the filter regeneration control is more easily stopped. Therefore, the accumulation amount of the PM in the exhaust filter 84 increases. Thereby, the passage resistance of the exhaust filter 84 increases, and by a quantity corresponding to that, the exhaust pressure on the exhaust upstream side relative to the exhaust filter 84 (=turbine downstream pressure PB) rises. Thus, according to the internal combustion engine 11, when the atmospheric pressure PA is low and the turbine downstream pressure PB easily decreases, it is possible to increase the PM accumulation amount in the exhaust filter 84, and to raise the turbine downstream pressure PB by a quantity corresponding to that. Therefore, it is possible to maintain the turbine downstream pressure PB at a high pressure. Thereby, it is possible to suppress an excessive increase in the expansion ratio of the exhaust turbine 27, and to suppress the decrease in the durability performance of the exhaust turbine 27.

Further, from results of various experiments and simulations by the inventors, it has been confirmed that the relation between the minimum necessary pressure difference ΔP of the exhaust filter 84 for maintaining the expansion ratio of the exhaust turbine 27 at an appropriate ratio and the atmospheric pressure PA is a relation in which the change amount of the above minimum necessary pressure difference ΔP associated with the change in the atmospheric pressure PA increases as the atmospheric pressure PA becomes lower.

In view of this point, as shown in FIG. 5, in the embodiment, the relation in which the change amount of the lower limit associated with the change in the atmospheric pressure PA increases as the atmospheric pressure PA becomes lower is decided, as the relation between the lower limit of the pressure difference ΔP and the atmospheric pressure PA. Specifically, the relation is a relation in which a change amount β1 of the lower limit when the atmospheric pressure PA changes by a predetermined amount α in a range in which the atmospheric pressure PA is low is greater than a change amount β2 of the lower limit when the atmospheric pressure PA changes by a predetermined amount α in a range in which the atmospheric pressure PA is high. By deciding such a relation, it is possible to set the lower limit to a value that is suitable for maintaining the expansion ratio of the exhaust turbine 27 at an appropriate ratio, depending on the atmospheric pressure PA.

Furthermore, in an engine operating range in which the exhaust pressure on the exhaust upstream side relative to the exhaust turbine 27 (the above turbine upstream pressure PU) is high, compared to an engine operating range in which the turbine upstream pressure PU is relatively low, the expansion ratio of the exhaust turbine 27 becomes high if the turbine downstream pressure PB is not high. Therefore, it is likely that the minimum necessary PM accumulation amount of the exhaust filter 84 for maintaining the expansion ratio of the exhaust turbine 27 at an appropriate ratio increases in an engine operating range in which the turbine upstream pressure PU is high.

In view of this point, in the embodiment, the lower limit is set to a higher value, as the engine operating range decided by the engine speed NE and the fuel injection amount is a range in which the turbine upstream pressure PU is higher. By setting such a value as the lower limit, in an engine operating range in which the turbine upstream pressure PU is higher, the pressure difference ΔP of the exhaust filter 84 more easily falls below the lower limit during the execution of the filter regeneration control, and the filter regeneration control is more easily stopped. Therefore, the accumulation amount of the PM in the exhaust filter 84 increases. Thereby, the passage resistance of the exhaust filter 84 increases, and by a quantity corresponding to that, the exhaust pressure on the exhaust upstream side relative to the exhaust filter 84 (=turbine downstream pressure PB) rises.

Thus, according to the internal combustion engine 11, in an engine operating range in which the turbine upstream pressure PU is high, it is possible to maintain the turbine downstream pressure PB at a high pressure, and therefore, it is possible to suppress an excessive increase in the expansion ratio of the exhaust turbine 27.

Here, in the embodiment, based on results of various experiments and simulations, the inventors have obtained in advance a relation of the pressure difference ΔP allowing the expansion ratio of the exhaust turbine 27 to fall within a permissible range, the engine operating range decided by the engine speed NE and the fuel injection amount, and the atmospheric pressure PA to be detected by the atmospheric pressure sensor 93.

Furthermore, based on the relation, a relation of a value (the lower limit) slightly higher than the minimum value of the pressure difference ΔP allowing the expansion ratio of the exhaust turbine 27 to fall within the permissible range, the above engine operating range and the atmospheric pressure PA is obtained in advance, and the relation is stored in the electronic control unit 90, as a computation map to be used for the calculation of the lower limit. The relation stored as the computation map is a relation that satisfies the above-described relation between the atmospheric pressure PA and the lower limit (the relation shown in FIG. 5) and the relation between the engine operating range and the lower limit. Then, at the time of the operation of the internal combustion engine 11, the lower limit is calculated from the above computation map, based on the engine speed NE, the fuel injection amount (specifically, the amount of the fuel to be injected from the fuel injection valve 22 in one combustion cycle), and the atmospheric pressure PA.

Here, when the atmospheric pressure PA is low, also by setting the nozzle opening degree of the variable nozzle mechanism 34 to an opening degree on the open side, it is possible to avoid an excessive increase in the expansion ratio of the exhaust turbine 27.

However, in this case, by a quantity corresponding to a quantity by which the nozzle opening degree is set to an opening degree on the open side, the flow velocity of the exhaust gas to blow on the turbine wheel 27A decreases, and the supercharging pressure decreases, causing a great decrease in the engine output. In contrast, the internal combustion engine 11 in the embodiment increases the accumulation amount of the PM in the exhaust filter 84, and thereby, raises the turbine downstream pressure PB to decrease the expansion ratio of the exhaust turbine 27. Thereby, it is possible to decrease the expansion ratio of the exhaust turbine 27, without decreasing the supercharging pressure. Therefore, according to the internal combustion engine 11, it is possible to suppress an excessive increase in the expansion ratio of the exhaust turbine 27, without causing a great decrease in the engine output.

Figure 6:
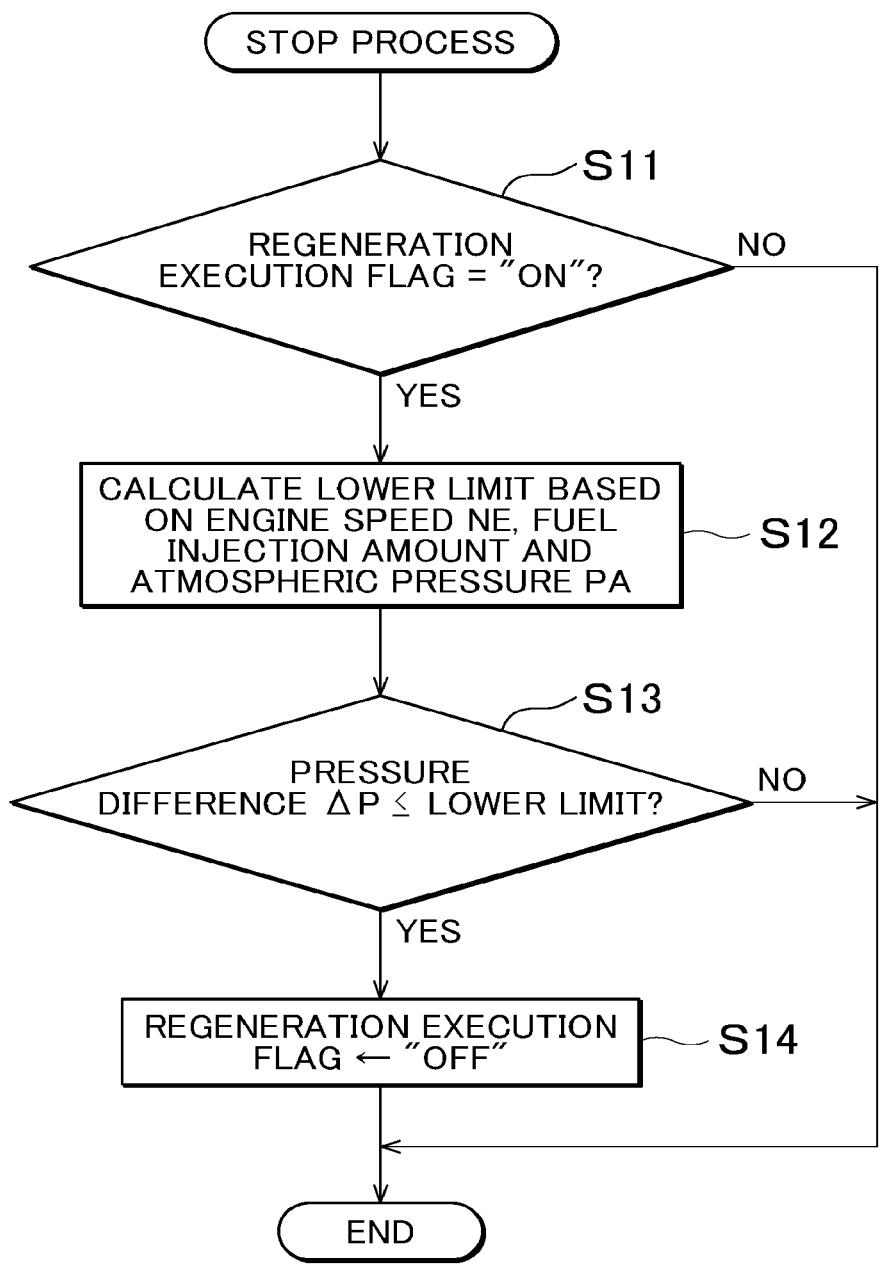
FIG. 6 is a flowchart showing an execution procedure of the stop process in the first embodiment.

Hereinafter, a process (stop process) of stopping the execution of the filter regeneration control based on the comparison between the pressure difference ΔP and the lower limit will be described. FIG. 6 shows an execution procedure of the above stop process, and a series of processes shown in the flowchart of the figure are executed by the electronic control unit 90, as an interrupt process in a predetermined cycle.

As shown in FIG. 6, in the process, first, whether the on-operation of the regeneration execution flag has been performed is determined (step S11). Then, in the case where the off-operation of the regeneration execution flag has been performed (step S11: NO), the process is finished once without executing the following process.

Thereafter, when the on-operation of the regeneration execution flag is performed (step S11: YES), the lower limit is calculated based on the engine speed NE, the fuel injection amount and the atmospheric pressure PA (step S12), and whether the pressure difference ΔP of the exhaust filter 84 is the lower limit or less is determined (step S13). Then, in the case where the pressure difference ΔP is greater than the lower limit (step S13: NO), the process is finished once, without stopping the execution of the filter regeneration control (without executing a process of step S 14), because there is a low possibility that the expansion ratio of the exhaust turbine 27 excessively increases.

Thereafter, when the pressure difference ΔP becomes the lower limit or less (step S13: YES), the off-operation of the regeneration execution flag is performed (step S14), for suppressing an excessive increase in the expansion ratio of the exhaust turbine 27. Thereby, the execution of the filter regeneration control is stopped, and thereafter, the PM accumulation amount of the exhaust filter 84 increases. Therefore, by a quantity corresponding to that, the turbine downstream pressure PB rises, so that the expansion ratio of the exhaust turbine 27 is maintained at a low ratio.

As described above, according to the embodiment, the following effects are obtained. (1) The lower limit of the pressure difference ΔP is set to a higher value, as the atmospheric pressure PA detected by the atmospheric pressure sensor 93 becomes lower. Therefore, when the atmospheric pressure PA is low and the turbine downstream pressure PB easily decreases, it is possible to increase the PM accumulation amount in the exhaust filter 84, and to raise the turbine downstream pressure PB by a quantity corresponding to that. Therefore, it is possible to maintain the turbine downstream pressure PB at a high pressure. Thereby, it is possible to suppress an excessive increase in the expansion ratio of the exhaust turbine 27, and to suppress the decrease in the durability performance of the exhaust turbine 27. Furthermore, it is possible to suppress an excessive increase in the expansion ratio of the exhaust turbine 27, without causing a great decrease in the engine output.

(2) The lower limit of the pressure difference ΔP is set to a higher value, as the engine operating range decided by the engine speed NE and the fuel injection amount becomes a range in which the turbine upstream pressure PU is higher. Thereby, in an engine operating range in which the turbine upstream pressure PU is high, it is possible to maintain the turbine downstream pressure PB at a high pressure, and therefore, it is possible to suppress an excessive increase in the expansion ratio of the exhaust turbine 27.

(3) The relation between the atmospheric pressure PA and the lower limit is a relation in which the change amount of the lower limit associated with the change in the atmospheric pressure PA increases as the atmospheric pressure PA becomes lower. Thereby, it is possible to set the lower limit to a value that is suitable for maintaining the expansion ratio of the exhaust turbine 27 at an appropriate ratio, depending on the atmospheric pressure PA.

Hereinafter, a second embodiment of the turbocharger-equipped internal combustion engine will be described with a focus on differences from the first embodiment.

The embodiment is different from the first embodiment in the following point. That is, in the first embodiment, the pressure difference of the exhaust filter and the lower limit are compared during the execution of the filter regeneration control, and when the pressure difference becomes the lower limit or less, the execution of the filter regeneration control is stopped. In contrast, in the embodiment, the pressure difference of the exhaust filter and the lower limit are compared, regardless of whether the filter regeneration control is being executed. Then, when the pressure difference of the exhaust filter becomes the lower limit or less, the operation mode of the internal combustion engine is switched from a mode (ordinary mode) in which the generation amount of the PM is relatively small, to a mode (PM generation mode) in which the generation amount of the PM is large.

Hereinafter, a process (switching process) of switching the operation mode of the internal combustion engine based on the comparison between the pressure difference of the exhaust filter and the lower limit will be described. Here, except constituents for a series of processes based on the comparison between the pressure difference of the exhaust filter and the lower limit, the internal combustion engine in the embodiment is identical to the internal combustion engine in the first embodiment. Therefore, for identical constituents, identical reference characters are assigned, and the detailed descriptions are omitted.

Figure 7:
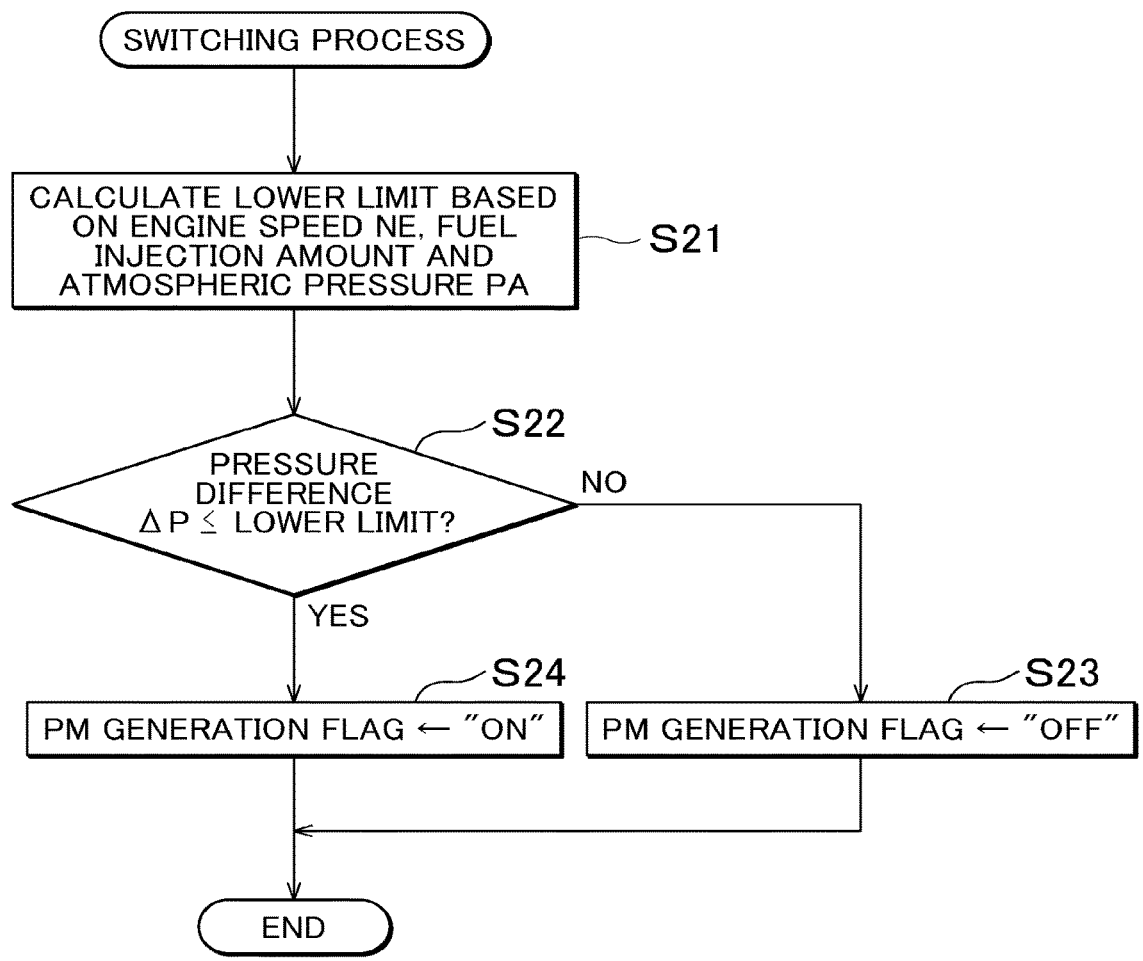
FIG. 7 is a flowchart showing an execution procedure of a switching process in a second embodiment.

FIG. 7 shows an execution procedure of the above switching process, and a series of processes shown in the flowchart of the figure are executed by the electronic control unit 90, as an interrupt process in a predetermined cycle. As shown in FIG. 7, in the process, first, the lower limit is calculated based on the engine speed NE, the fuel injection amount and the atmospheric pressure PA (step S21), and whether the pressure difference ΔP of the exhaust filter 84 is the lower limit or less is determined (step S22). Then, when the pressure difference ΔP is greater than the lower limit (step S22: NO), the off-operation of a PM generation flag is performed (step S23), because there is a low possibility that the expansion ratio of the exhaust turbine 27 excessively increases. The PM generation flag is a flag for which the on-operation results in the execution of the engine operation in the PM generation mode while the off-operation results in the prohibition of the engine operation in the PM generation mode. Therefore, in the process of step S23, the engine operation in the PM generation mode is prohibited, and the engine operation in the ordinary mode is executed.

On the other hand, when the pressure difference ΔP of the exhaust filter 84 is the lower limit or less (step S22: YES), the on-operation of the PM generation flag is performed (step S24), for suppressing an excessive increase in the expansion ratio of the exhaust turbine 27. Thereby, the internal combustion engine 11 is operated in the PM generation mode.

Figure 8:
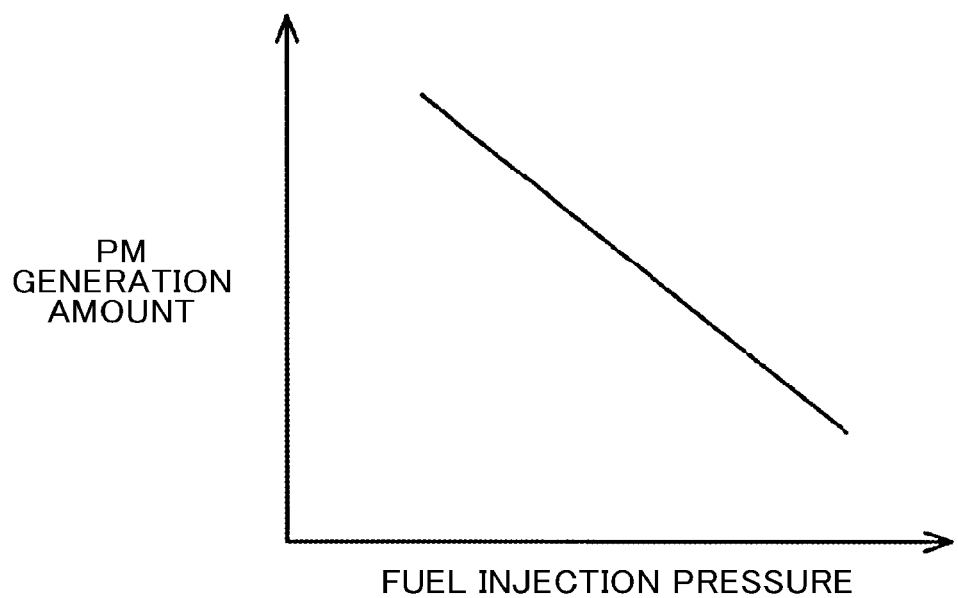
FIG. 8 is a graph showing a relation between fuel injection pressure and PM generation amount.
Figure 9:
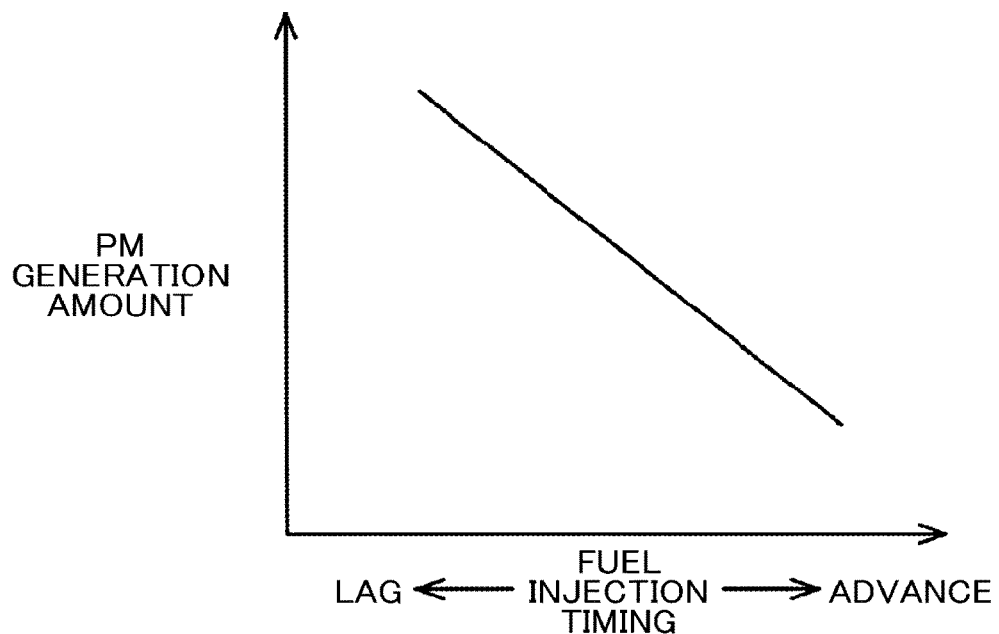
FIG. 9 is a graph showing a relation between fuel injection timing and the PM generation amount.

Here, as shown in FIG. 8, there is a tendency that the amount of the PM contained in the exhaust gas of the internal combustion engine 11 increases as the pressure (fuel injection pressure) of the fuel to be injected from the fuel injection valve 22 becomes lower during the engine operation. Further, as shown in FIG. 9, there is a tendency that the amount of the PM contained in the exhaust gas of the internal combustion engine 11 increases as the timing (fuel injection timing) when the fuel is injected from the fuel injection valve 22 becomes earlier. In view of such a circumstance, the engine control in the embodiment increases the generation amount of the PM at the time of the engine operation in the PM generation mode compared to at the time of the engine operation in the ordinary mode, by raising the fuel injection pressure or advancing the fuel injection timing in the PM generation mode relative to in the ordinary mode, in the comparison under the condition that the engine operating state is identical. In the embodiment, the fuel injection valve 22 corresponds to the regulation unit.

Hereinafter, an action due to the execution of such a switching process will be described. In the embodiment, when the pressure difference ΔP of the exhaust filter 84 becomes the lower limit or less, the engine operation in the PM generation mode is executed, for suppressing an excessive increase in the expansion ratio of the exhaust turbine 27. Thereby, the amount of the PM contained in the exhaust gas of the internal combustion engine 11 increases compared to at the time of the engine operation in the ordinary mode. Therefore, the amount of the PM to be accumulated in the exhaust filter 84 increases, and the turbine downstream pressure PB rises, so that the expansion ratio of the exhaust turbine 27 is maintained at a low ratio.

Here, when the engine operation is continued in a state in which the exhaust gas temperature is extremely high, as exemplified by a state of a high-revolution and high-load operation, the heat of the exhaust gas promotes the oxidation combustion of the PM in the exhaust filter 84. Thereby, the PM accumulation amount in the exhaust filter 84 decreases, and the turbine downstream pressure PB rises. Therefore, there is a fear that the expansion ratio of the exhaust turbine 27 excessively increases. Even in such a case, according to the embodiment, when the pressure difference ΔP becomes the lower limit or less, the internal combustion engine 11 is operated in the PM generation mode. Therefore, the amount of the PM contained in the exhaust gas increases, and the PM accumulation amount in the exhaust filter 84 increases, so that the turbine downstream pressure PB rises. Thereby, it is possible to suppress an excessive increase in the expansion ratio of the exhaust turbine 27.

The embodiment provides the same effects as the effects described in the above (1) to (3). Here, the above embodiments may be modified as follows.

Figure 10:
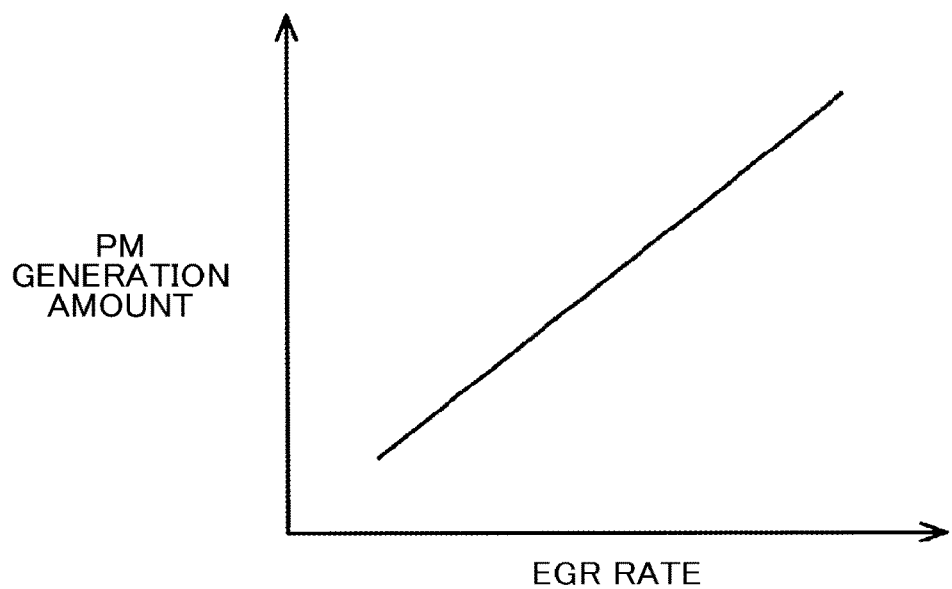
FIG. 10 is a graph showing a relation between EGR rate and the PM generation amount.

In the second embodiment, as parameters to be regulated for increasing the PM generation amount in the engine operation in the PM generation mode, without being limited to the fuel injection pressure and the fuel injection timing, an arbitrary engine parameter can be employed if the engine parameter allows the generation amount of the PM to increase. For example, in the case of an internal combustion engine including an exhaust gas recirculation apparatus that meters some of the exhaust gas and recycles it to the combustion chamber 13, the value (so-called EGR rate) resulting from dividing the amount of the exhaust gas to be recycled to the combustion chamber 13 by the amount of the gas to be taken in the combustion chamber 13 may be employed as the above parameter. As shown in FIG. 10, there is a tendency that the amount of the PM contained in the exhaust gas of the internal combustion engine increases as the EGR rate at the time of the engine operation rises. In the above internal combustion engine, it is possible to increase the generation amount of the PM at the time of the engine operation in the PM generation mode compared to at the time of the engine operation in the ordinary mode, by raising the EGR rate in the PM generation mode relative to the EGR rate in the ordinary mode, in the comparison under the condition that the engine operating state is identical. In such an internal combustion engine, a member to be actuated for the regulation of the EGR rate (an EGR valve, a valve timing mechanism or the like) functions as the regulation unit.

In the embodiments, the calculation of the lower limit based on the engine speed NE, the fuel injection amount and the atmospheric pressure PA can be executed using a computation formula that is previously stored in the electronic control unit 90, other than the computation map that is previously stored in the electronic control unit 90.

In the embodiments, the relation of the engine speed NE, the fuel injection amount and the lower limit of the pressure difference ΔP can be arbitrarily altered, as long as the lower limit is set to a higher value in an engine operating range in which the turbine upstream pressure PU is high, compared to an engine operating range in which the turbine upstream pressure PU is low. For example, only two values of a lower limit A1 for an engine operating range in which the turbine upstream pressure PU is high and a lower limit B1 for an engine operating range in which the turbine upstream pressure PU is low (here, A1>B1) may be decided as the lower limit under the condition that the atmospheric pressure PA is identical. Such a configuration can be actualized by previously obtaining a relation of the engine speed NE, the fuel injection amount, the atmospheric pressure PA and the lower limit of the pressure difference ΔP that satisfies the relation of the lower limits A1, B1, and setting the relation as a computation map (or a computation formula). In addition, the above configuration can be also actualized, for example, by setting a high-pressure map to be used for an engine operating range in which the turbine upstream pressure PU is high and a low-pressure map to be used for an engine operating range in which the turbine upstream pressure PU is low, as the computation map to be used for the calculation of the lower limit.

In the embodiments, the value to be used for specifying the engine operating range is not limited to the engine speed NE and the fuel injection amount, and it is possible to employ an arbitrary engine parameter such as the amount of the air to be taken in the internal combustion engine 11, or the intake gas temperature.

In the embodiments, the relation between the atmospheric pressure PA and the lower limit of the pressure difference ΔP can be arbitrarily altered, as long as the lower limit when the atmospheric pressure PA is low is a higher value compared to the lower limit when the atmospheric pressure PA is high. For example, only two values of a lower limit A2 for the case where the atmospheric pressure PA is high and a lower limit B2 for the case where the atmospheric pressure PA is low (here, A2>B2) may be decided as the lower limit under the condition that the turbine upstream pressure PU (specifically, the engine operating range decided by the engine speed NE and the fuel injection amount) is identical. Such a configuration can be actualized by previously obtaining a relation of the engine speed NE, the fuel injection amount, the atmospheric pressure PA and the lower limit of the pressure difference ΔP that satisfies the relation of the lower limits A2, B2, and setting the relation as a computation map (or a computation formula). In addition, the above configuration can be also actualized, for example, by setting a low-pressure map to be used when the atmospheric pressure PA is low and a high-pressure map to be used when the atmospheric pressure PA is high, as the computation map to be used for the calculation of the lower limit.

In the embodiments, the lower limit of the pressure difference ΔP can be calculated, using the atmospheric pressure PA as the calculation parameter for the lower limit, instead of using the engine speed NE and the fuel injection amount. In this case, a fixed value (low-pressure value L) to be used when the atmospheric pressure PA is a predetermined pressure or lower and a fixed value (high-pressure value H, here L>H) to be used when the atmospheric pressure PA is higher than the predetermined pressure may be decided as the lower limit.

In the embodiments, the detection of the pressure difference ΔP of the exhaust filter 84 is not limited to the detection by the differential pressure sensor 92. The exhaust pressure on the exhaust upstream side relative to the exhaust filter 84 and the exhaust pressure on the exhaust downstream side relative to the exhaust filter 84 may be separately detected by pressure sensors, and the difference between the exhaust pressures may be detected as the pressure difference of the exhaust filter 84.

What is claimed is:

1. A turbocharger-equipped internal combustion engine comprising:
    an exhaust turbine provided in an exhaust passage of the internal combustion engine;
    an exhaust filter provided on an exhaust downstream side of the exhaust passage relative to the exhaust turbine, the exhaust filter configured to collect particulate matter in exhaust gas;
    a differential pressure detector configured to detect a pressure difference between an exhaust upstream side and an exhaust downstream side of the exhaust passage relative to the exhaust filter;
    an atmospheric pressure sensor configured to detect atmospheric pressure; and
    an electronic control unit configured to control the internal combustion engine such that accumulation amount of the particulate matter in the exhaust filter is regulated, wherein
        the electronic control unit is configured to control the internal combustion engine such that the accumulation amount of the particulate matter in the exhaust filter is increased when the pressure difference detected by the differential pressure detector is a lower limit or less, and
        the electronic control unit is configured to set the lower limit such that the lower limit becomes a higher value as the atmospheric pressure detected by the atmospheric pressure sensor becomes lower.

2. The turbocharger-equipped internal combustion engine according to claim 1, wherein the electronic control unit is configured to set the lower limit such that the lower limit becomes a higher value in an operating range in which an exhaust pressure on the exhaust upstream side relative to the exhaust turbine is higher.

3. The turbocharger-equipped internal combustion engine according to claim 1, wherein a relation between the atmospheric pressure detected by the atmospheric pressure sensor and the lower limit is a relation in which a change amount of the lower limit associated with a change in the atmospheric pressure increases as the atmospheric pressure becomes lower.

4. The turbocharger-equipped internal combustion engine according to claim 2, wherein a relation between the atmospheric pressure detected by the atmospheric pressure sensor and the lower limit is a relation in which a change amount of the lower limit associated with a change in the atmospheric pressure increases as the atmospheric pressure becomes lower.

* * * * *